Aug. 7, 1951     D. C. TURNBULL     2,563,084
CONTINUOUS TUMBLING MILL
Filed May 1, 1948     5 Sheets—Sheet 1

INVENTOR.
DAVID C. TURNBULL
BY
Austin, Wilhelm + Carlson
ATTORNEYS

Aug. 7, 1951 D. C. TURNBULL 2,563,084
CONTINUOUS TUMBLING MILL
Filed May 1, 1948 5 Sheets-Sheet 4

INVENTOR.
DAVID C. TURNBULL
BY
Austin, Wilhelm & Carlson
ATTORNEYS.

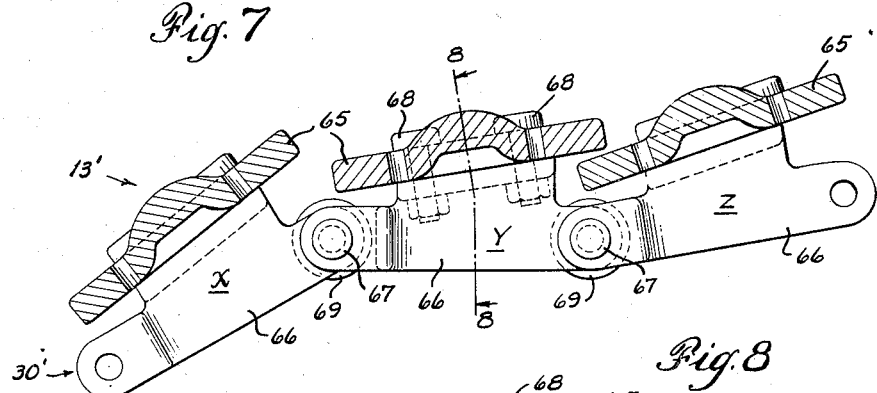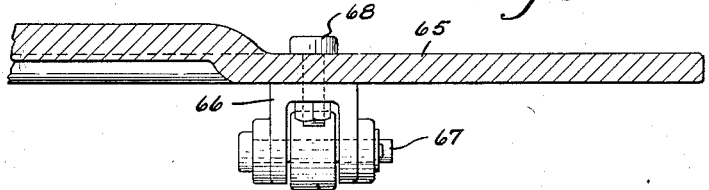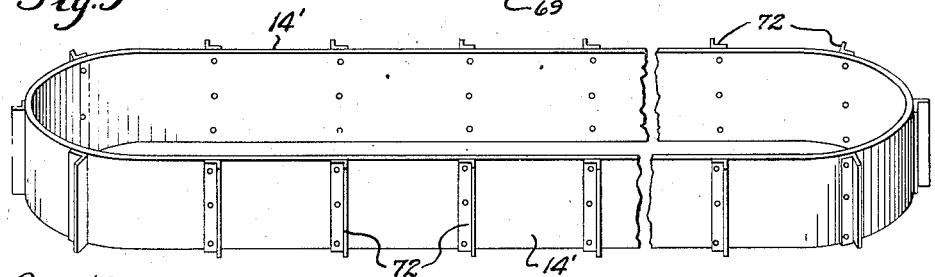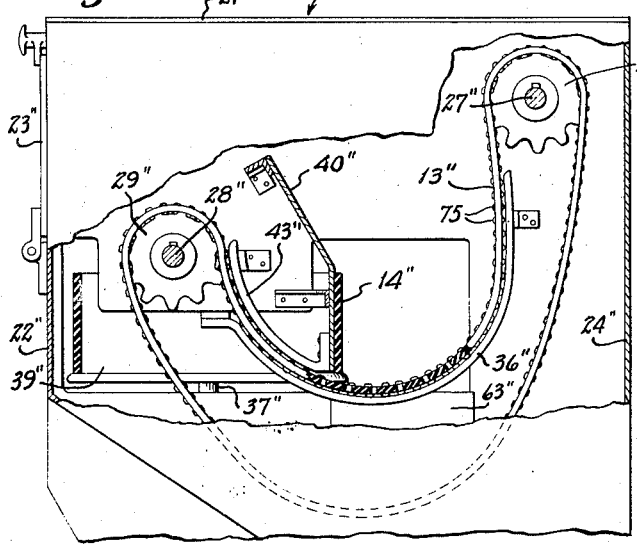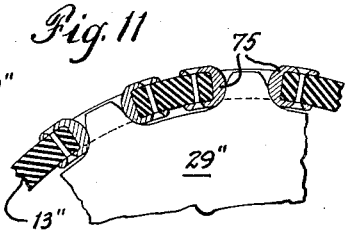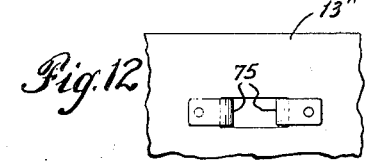

Patented Aug. 7, 1951

2,563,084

UNITED STATES PATENT OFFICE 2,563,084

CONTINUOUS TUMBLING MILL

David C. Turnbull, Mishawaka, Ind., assignor to American Wheelabrator & Equipment Corporation, Mishawaka, Ind., a corporation of Nebraska Application May 1, 1948, Serial No. 24,510

9 Claims. (Cl. 51—13)

The invention relates to treating metal or other articles, and more particularly to a mill for cleaning, polishing, hardening, or otherwise treating, such objects as metal castings, forgings and the like.

According to a preferred embodiment of the invention, the mill comprises an endless tumbling conveyor supported by upper and lower shafts and forming upper and lower plies. The upper ply forms an outwardly concave pocket which holds the workpieces to be treated. The conveyor moves in a direction from its lower shaft toward its upper shaft; this movement carries the workpieces with it to some point from which the workpieces fall back, describing a generally tumbling action. A special tie chain rides on sprockets on the upper and lower conveyor shafts to maintain proper relationship between positions of the upper and lower plies.

The tumbling conveyor is located within a cabinet at the top of which is located one or more airless blast wheels which project through into the cabinet roof and direct a blast of treating particles on the workpieces being tumbled.

Extending across the one side of the workholding pocket of the tumbling conveyor is one ply of an endless feed conveyor which may be in the form of a flexible belt. As the workpieces are tumbled, they fall back against this ply which gradually moves the workpieces from the feeding end of the mill to the discharge end of the mill. The feed conveyor may be laterally supported by a vertical backing plate.

The feed end of the mill is provided with a charge hopper or feed chute into which the articles to be treated are fed. The discharge end of the mill is provided with a discharge chute into which the treated articles are automatically fed and from which they are removed from the mill. The feed conveyor passes through part of the charging and discharging chutes which are disposed adjacent end extensions on the cabinet. These extensions house drums for supporting the feed conveyor belt.

The bottom of the cabinet has sloping walls forming a receiving hopper which receives the spent blast material. This hopper guides this material to a bucket elevator located alongside the cabinet. The bucket elevator may carry the blast material to suitable cleaning and screening devices located above the mill whence the material is re-circulated back to the blast wheel.

The tumbling conveyor, feed conveyor and blast wheel are independently driven by separate electric motors. Speed changing devices are incorporated in the drives to the tumbling conveyor and to the feed conveyor so that the speed of each conveyor may be independently adjusted to give best results for each particular type of work being treated.

Features of the present invention include the use of the independently controlled feed conveyor and its relationship to the tumbling conveyor and other parts of the mill; the tie chain for retaining fixed relationship between upper and lower tumbling conveyor plies; the particular constructions of the tumbling and feeding conveyors.

The invention also consists in certain new and original features and combinations hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which:

Fig. 7 is a detail of a modified form of tumbler conveyor flight construction, this view being specially prepared to illustrate the capability of the conveyor to flex in either direction;

Fig. 8 is a section on the line 8—8 of Fig. 7;

Fig. 9 is a perspective of a modified form of feed conveyor;

Fig. 10 is a fragmentary side elevation of a modified form of mill using a rubber tumbling conveyor;

Fig. 11 is a longitudinal fragmentary section taken through the sprocket tooth holes of the conveyor shown in Fig. 10; and Fig. 12 is a detail plan view of one of the sprocket tooth holes of the conveyor shown in Fig. 10.

Figure 1:
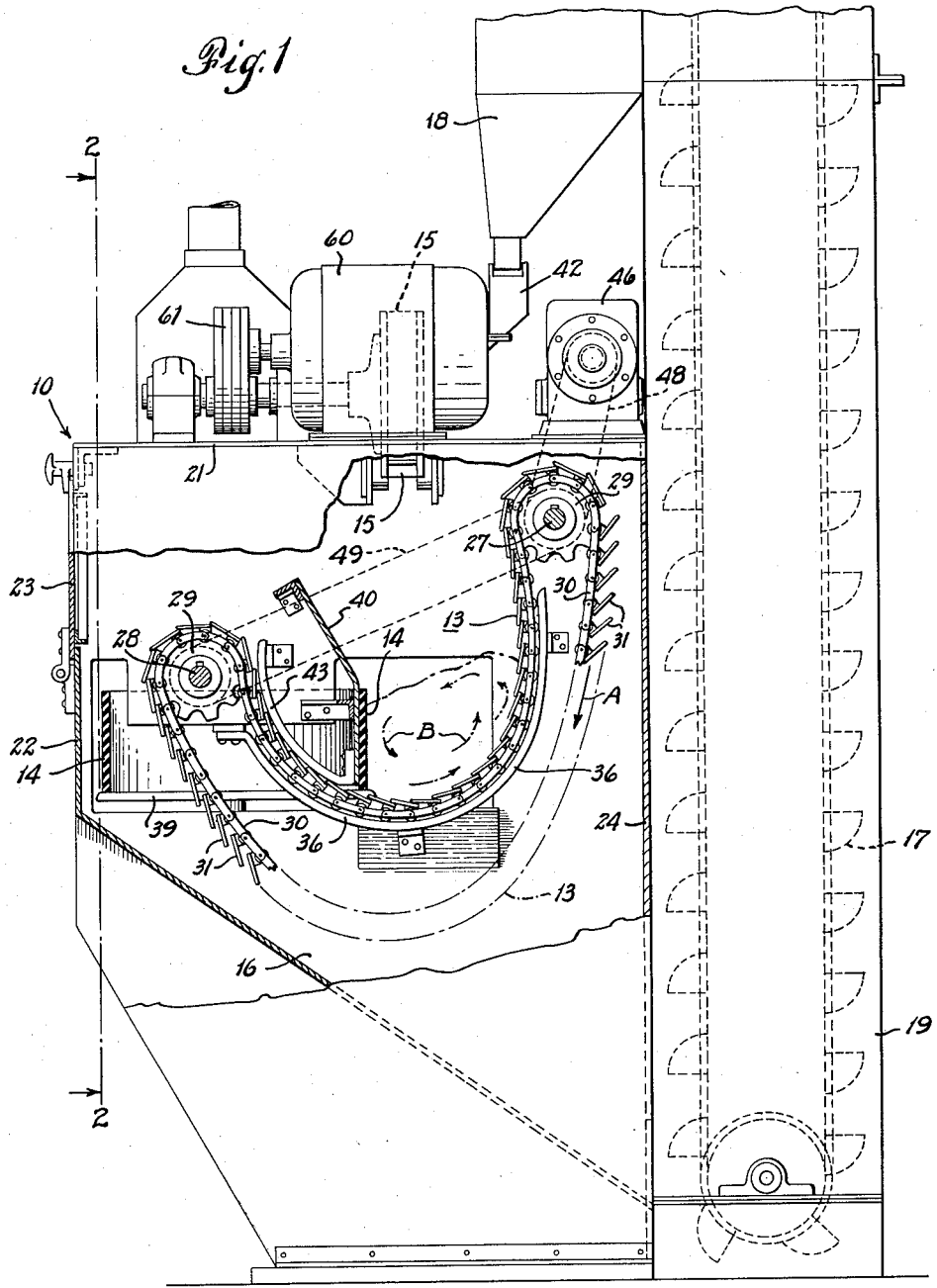
Fig. 1 is a side elevation with parts broken away to show the tumbling conveyor and the feed conveyor.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Figure 2:
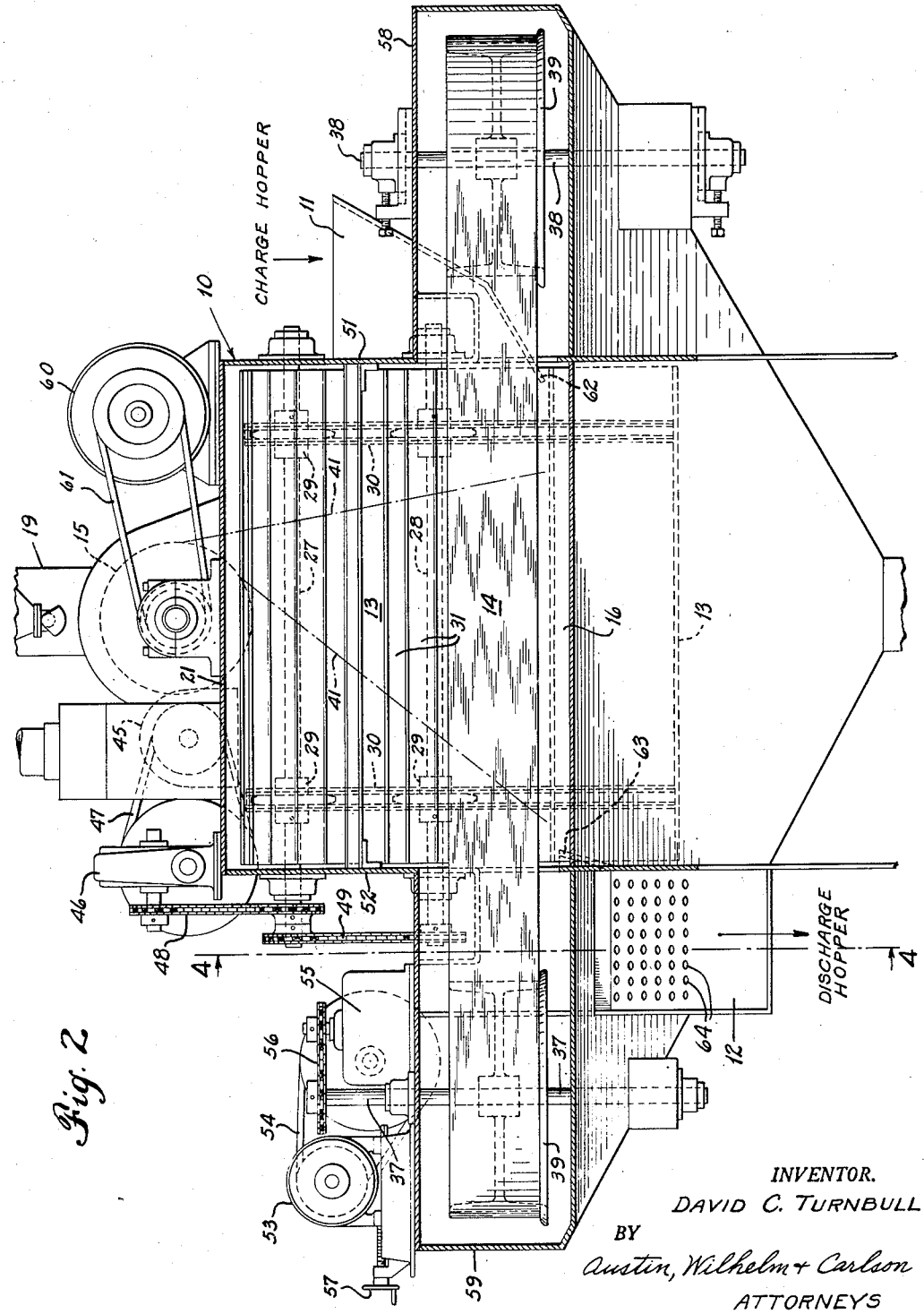
Fig. 2 is a front section taken on the line 2—2 of Fig. 1.
Figure 3:
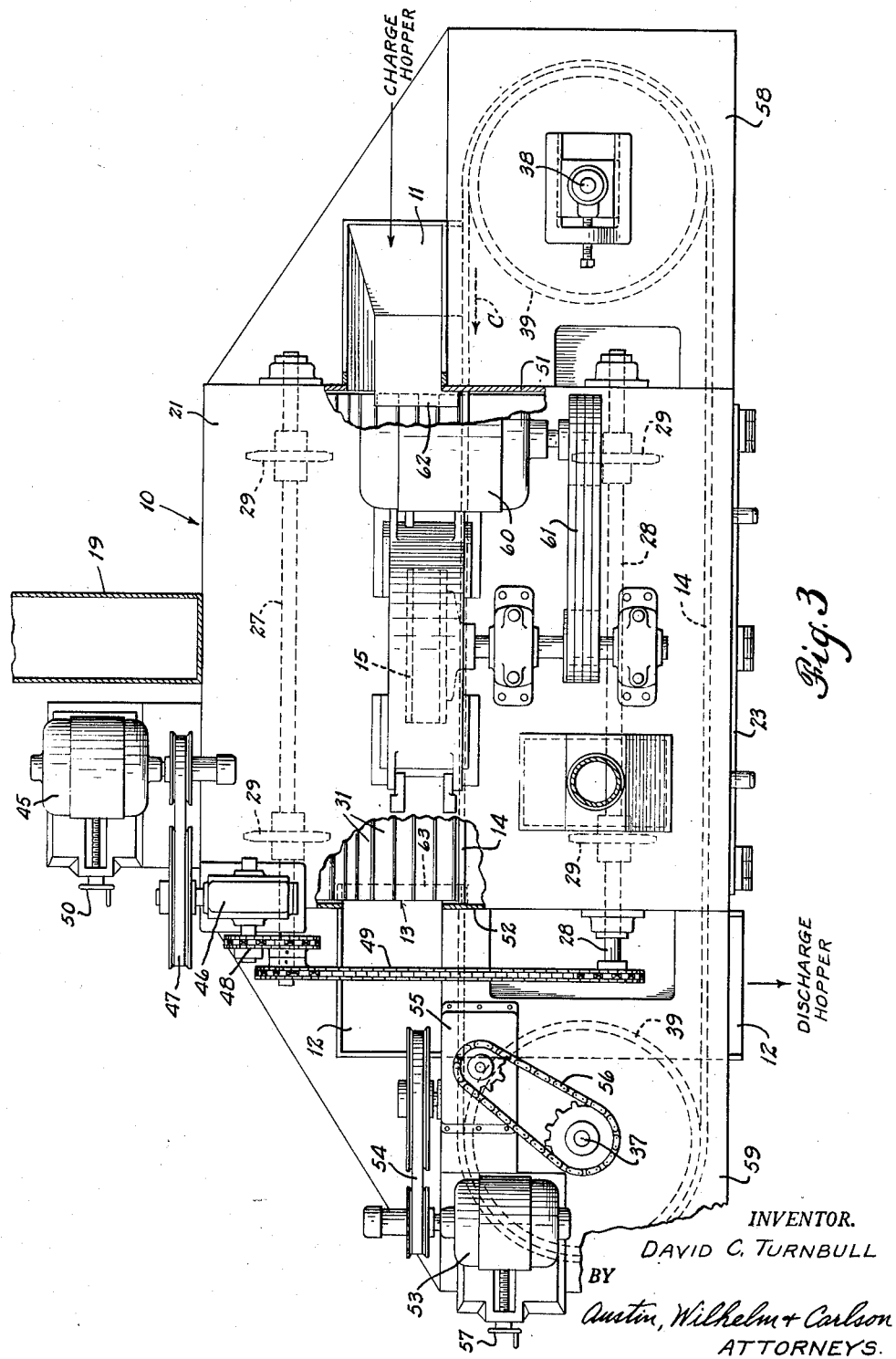
Fig. 3 is a plan view with certain parts in section.

Referring now to the drawings, and more particularly to Figs. 1, 2 and 3, the mill comprises, in general, a cabinet, indicated generally by 10, having a charge hopper or feed chute 11 at one end of the cabinet, and a delivery or discharge chute 12 at the other end. Inside the cabinet is a tumbler conveyor 13 and a feed conveyor 14. The tumbler conveyor 13 moves in the direction of the arrows A of Fig. 1, causing the workpieces to tumble in somewhat the manner indicated by the arrows B; at the same time, the workpieces are slowly moved from feed chute to delivery chute by the feed conveyor 14 moving in the direction of the arrow C in Fig. 3.

While the workpieces are being tumbled within the cabinet, they are subjected to a blast of particles from airless blast wheel 15. The spent blast particles are collected in receiving hopper 16 whence they are delivered to bucket elevator 17. Elevator 17 delivers the blast material to overhead hoppers for cleaning, or other treatment, well known in the art, from which the blast material is re-circulated to supply chute 18 back to the blast wheel 15.

A more detailed description follows:

Th cabinet 10 is made up of the usual steel framework with steel panels to form an interior blasting chamber in which the blasting occurs. The cabinet has a top wall 21; a front wall 22 with door 23; it has a back wall 24; it has a bottom hopper 16 whose bottom walls slope from end to end, as shown in Fig. 2, and from front to back, as shown in Fig. 1, to deliver spent blast to the bottom of the bucket elevator housing 19. The blasting chamber has end walls 51, 52 provided with feed and discharge openings which communicate with the feed chute 11 and discharge chute 12. Projecting beyond the vertical end walls 51, 52 of the blasting chamber are housings 58, 59 to house the feed conveyor pulleys 39.

Figure 5:
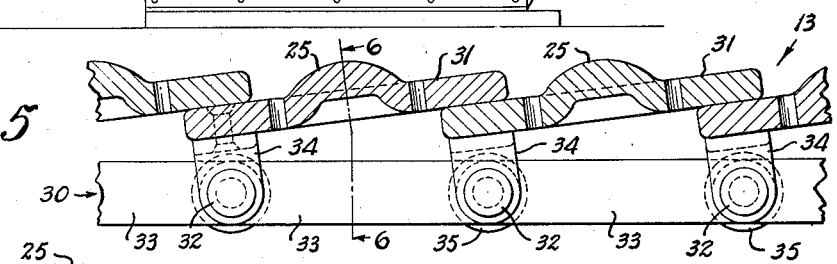
Fig. 5 is a detail of the tumbler conveyor flights and manner of mounting on conveyor chains.
Figure 6:
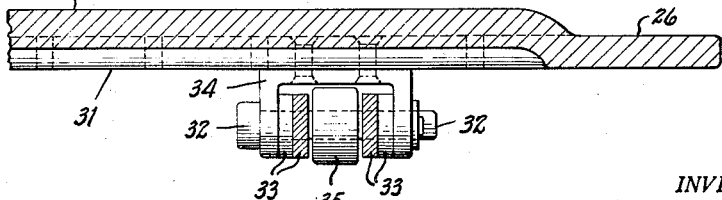
Fig. 6 is a section on the line 6—6 of Fig. 5.

The tumbler conveyor 13, Fig. 1, is mounted upon two main horizontal shafts 27 and 28 suitably journaled in the cabinet walls. These shafts support sprockets 29 which, in turn, support conveyor chains 30, one on either side. Extending between and beyond the conveyor chains 30 are the slat-like flights 31 (see also Figs. 5 and 6). These flights, together with the chains, form, in effect, a wide, traveling, endless belt or conveyor.

The tumbler conveyor 13 is constructed as follows. The chains 30 are made up of a plurality of links 33 connected by pins 32. The pins support rollers 35 located between the links. On each pin 32 is swiveled a U-shaped lug 34 suitably riveted to a flight 31. It will be noted that the successive flights 31 are mounted in overlapping relation and have longitudinally extending ribs 25 and flattened ends 26. The flights also have a plurality of holes to promote sifting through of the spent abrasive.

Figure 4:
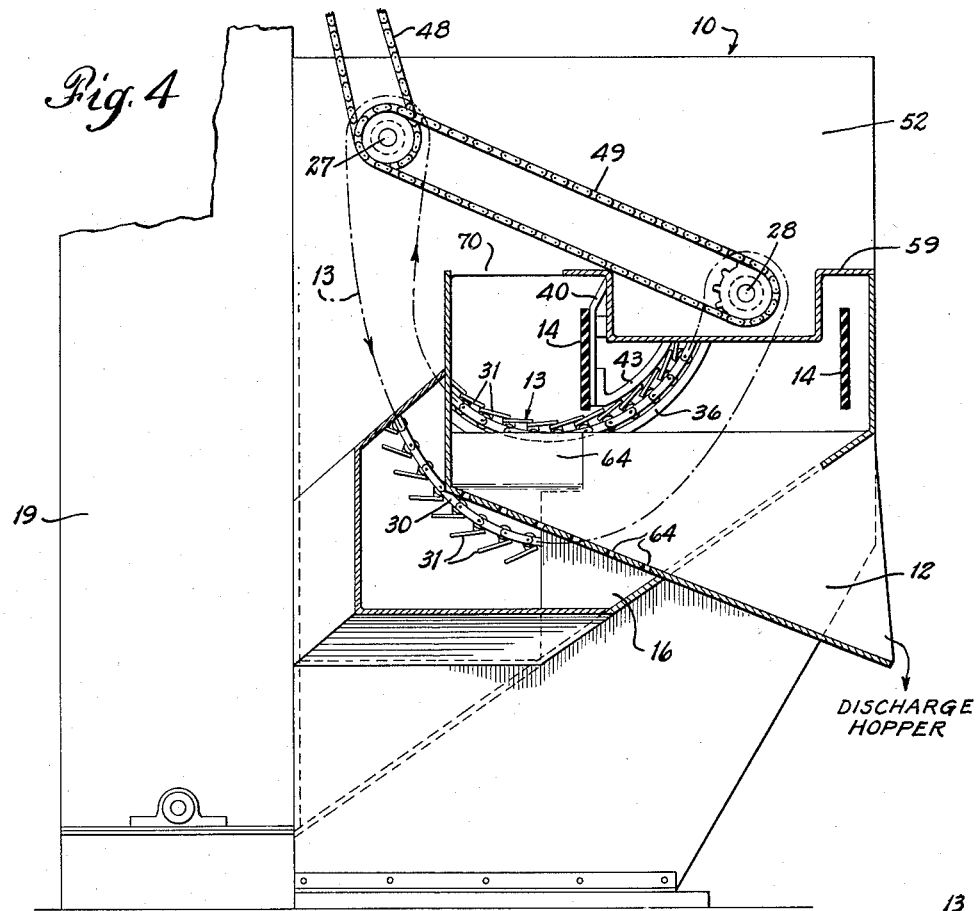
Fig. 4 is a section taken on the line 4—4 of Fig. 2 and illustrating the tumbling conveyor and the discharge chute.

It will be noted, particularly from Figs. 1 and 4, that the endless tumbling conveyor 13, as mounted on its two supporting shafts, forms an upper ply and a lower ply. The upper ply forms a concave work-holding pocket and is constrained to move in a desired, approximately arcuate, path by guides 36 and 43 mounted on the end walls of the casing. The lower guides 36 are mounted directly under the rollers 35 so the rollers may roll on them and thus support the weight of the workpieces. The upper guide 43 may be located directly above the lower guides 36. The upper guides 43 are located behind the backing plate 40 and are thus protected from the blast.

It will be seen that the tumbling conveyor 13 moves in the direction of the arrow A in Fig. 1 and that the flights 31 are in overlapping relation as they pass through the work-holding pocket. As the upper ply of the tumbler conveyor passes over the sprockets on the upper supporting shaft 27, the flights 31 may swing outwardly, as indicated in Fig. 1. As the lower ply approaches the lower shaft 28 the flights swing back into overlapping relation.

The feed conveyor 14 comprises a flat belt which may be made of some rubber-like, flexible material suitably reinforced by woven wire, etc. This belt has its plies in a vertical plane, one ply passing through the posterior side of the work-holding pocket where it is supported by backing plate 40. The other ply is located near the front wall 22 of the cabinet.

The feed conveyor 14 passes through the end walls 51, 52 of the cabinet and around supporting drums 39 mounted in the cabinet extensions 58, 59. The drums 39 have a lower radial flange to prevent the belt from slipping off. The drums 39 are mounted upon vertical shafts 37 and 38 suitably journaled in the frame of the cabinet and protected from the blast.

The backing plate 40 is located where the feed conveyor 14 passes through the tumbling chamber. This backing plate extends throughout the length of the tumbling pocket and from end wall to end wall. The lower portion of plate 40 laterally slidably supports the conveyor 14 and the upper portion is inclined somewhat to protect the tumbling conveyor 13 from the abrasive blast.

The bottom wall of the feed chute 11 has an apron or extension 62 disposed over the projecting flights 31 of the tumbling conveyor, as shown in Fig. 2. The flights 31 of the tumbling conveyor extend over an inwardly deflected end wall or apron 63 at the discharge opening. The feed conveyor 14 forms part of the side wall of the feed chute 11 and of the discharge chute 12 (see Fig. 3).

The delivery chute 12 has holes 64 in the bottom communicating with the bottom hopper 16 to discharge any entrapped blast particles which may be carried out with the workpieces. The delivery chute may have an open top as indicated by 70 in Fig. 4.

Both the inlet and outlet openings in end walls 51 and 52 are in substantial register with the work-holding pocket as defined by the feed belt 14 and by the vertical rise of the tumbling conveyor which limits the tumbling travel of the work.

All of this promotes automatic unimpeded travel of the workpieces into the mill, through the mill and out of the mill.

For delivering the blast, airless blast wheel 15 is provided; a segment of the wheel projects through the top wall 21 of the cabinet into the blast chamber. This wheel may be of any well known type, but preferably is the type known commercially as the Wheelabrator, manufactured by American Wheelabrator & Equipment Corporation, of Mishawaka, Indiana.

When blast material is fed by feed spout 42 to the center of the wheel 15, the wheel delivers a blast whose pattern is indicated somewhat by the lines 41 in Fig. 2. This blast impinges upon the work being tumbled in the tumbling pocket of the tumbling conveyor, thoroughly treating the workpieces on all surfaces. This blast may be an abrasive blast for cleaning castings and the like; or it may be a peening blast for conditioning the surface of the workpieces; or it may be a honing or finishing blast of a liquid slurry made up of polishing or honing particles carried by suitable liquid vehicle. If desired, a plurality of blast wheels, instead of the single wheel shown, may be used.

It will be noted that the blast pattern of the single wheel illustrated is elongate in the direction of feed movement of the workpieces through the machine, that is, lengthwise of the trough or pocket formed by the tumbling conveyor. The blast pattern is comparatively narrow in the direction of tumbling movement so as to avoid undue wear on backing plate 40 and feed conveyor 14. The work being tumbled receives the full effect of the blast.

The blast particle circulation is as follows. Blast material is supplied to the center of the blast wheel 15 by the feed spout 42, as is well known by those skilled in the art. The blast material, after blasting the workpieces, filters through and around the workpieces and through the tumbling conveyor and is finally collected in the collecting hopper 16. The spent material then flows by gravity to the bottom of bucket elevator 17 which raises the spent material to a point above the cabinet where the abrasive may be cleaned or otherwise treated by standard appliances. The blast material is then returned to the supply hopper 18 whence it passes to feed spout 42 to complete the cycle.

The tumbling conveyor, the feed conveyor, and blast wheel are all separately driven by separate electric motors.

The tumbling conveyor 13 is driven by motor 45 mounted at the top of the cabinet. Motor 45 drives gear reducer 46 through belt 47. Gear reducer 46 drives top supporting shaft 27 by chain 48. Tumbling conveyor supporting shafts 27 and 28 are tied together by a tie chain 49 riding on suitable sprockets mounted on the ends of these shafts. This tie chain 49 drives the lower supporting shaft 28 at the same speed as the upper shaft 27 to keep the lengths of the upper and lower plies of the tumbling conveyor 13 in fixed relationship.

The feed conveyor 14 is driven by motor 53 mounted upon top of the cabinet extension. Motor 53 drives belt 54 which drives speed reducer 55; speed reducer 55 drives drum shaft 37 through chain 56.

The blast wheel 15 is driven by motor 60 mounted on top of the cabinet. Motor 60 drives blast wheel 15 through multiple belts 61.

The speed reduction from the several drive motors 45 and 53 are independently adjustable by adjusting wheels 50 and 57 so that the speeds of the tumbling conveyor 13 and of the feed conveyor 14 may be independently adjusted for each particular class of work. The speed-adjusting wheels 50 and 57 adjust the positions of motors 45 and 53 and thereby the effective diameters of the motor pulleys as is well known with this type of variable-speed drive.

To use the mill, the conveyor motors and the blast wheel motor are started and blast cycle started. The workpieces are fed into the feed hopper 11 by suitable conveyor means (not shown). The workpieces in feed hopper 11 immediately contact the feed conveyor 14 moving in direction of arrow C in Fig. 3; this carries the work into the mill, through the mill and out into the discharge chute 12 where a suitable conveyor (not shown) may be provided for receiving the treated pieces.

As the workpieces enter upon the tumbling conveyor 13, they are carried upwardly to a certain distance toward the vertical section of the conveyor, after which they fall back against the feed conveyor describing a tumbling action somewhat as indicated by the arrows B in Fig. 1. This tumbling action exposes all surfaces of the work to the blast. At the same time contact of the work with the feed conveyor 14 slowly carries the work through the blasting chamber.

Both tumbling speed and feeding speed can be nicely and independently controlled by the operator to suit the kind of work being treated. These speeds may be determined by trial or from previous experience. Fragile work may require slower tumbling to avoid breakage. Dirty castings requiring more blasting will generally require slower feeding movement through the machine than comparatively clean castings.

The support of the tumbling conveyor 13 on two shafts 27 and 28 with the tying chain 49 maintains the positions of the conveyor loops or plies and reduces the drag of the conveyor chains on the supporting tracks 36 and guide bars 43. These tracks and bars also limit sidesway and hold the upper ply in the arcuate or other desired form.

The door 23 in the front of the cabinet permits access to the interior of the mill for observation, to remove work that may jam, and for replacement of parts. The entrance and exit openings to the cabinet with respect to the blast pattern and in relation to the feed and discharge chutes facilitates sealing in of the flying blast particles.

The present continuous mill has many advantages over batch type mills and other previous continuous mills. The independent control of the present tumbling conveyor and feeding conveyor gives nice adjustment to the speed of tumbling and to the speed of conveying the workpieces through the machine. The action of the present machine handles, equally well, comparatively round workpieces which tend to pass more easily through the blast zone and elongate or angular workpieces which do not move so easily. The feed conveyor extending into the feed and discharge chutes reduces jamming that may otherwise occur at the feeding or discharge points.

Referring now to Figs. 7 and 8, a modified form of tumbling conveyor 13' may be used instead of conveyor 13. Here the two chains 30' may be made up of U-shaped links 66 connected by pins 67. Located between the links on the pins are rollers 69. In this case the links 66 have an inclined cross piece to which the flights 65 are rigidly connected by bolts 68. It will be noted that the flights 65 are similar to the flights 31 of Figs. 1 to 6.

It will be noted that the flights 65 are rigidly mounted on their particular links 66 and are not pivoted thereto as in Figs. 1 to 6. The flight construction is such that the flights have normal overlapping relation when the conveyor 13' is concave upwardly, which is its shape when supporting the workpieces. Such relationship is illustrated by the links Y and Z in Fig. 7, which figure was specially prepared to illustrate the capability of the conveyor 13' to flex in opposite directions. The relationship between links X and Y in Fig. 7 illustrates the position these links will take when the tumbling conveyor 13' takes an outwardly convex position, as when passing around the supporting sprockets.

Referring to Fig. 9, the modified feed conveyor 14' here is provided with a plurality of cleats or angle irons 72 suitably riveted to the flexible wire-reinforced band, to assist in carrying the workpieces through the blasting zone. This may be used in place of feed conveyor 14 of Figs. 1 to 6.

Referring now to Figs. 10 to 12 a mill is shown with a further modified form of tumbler conveyor 13". The parts are otherwise generally similar to corresponding parts in Figs. 1 to 6 so will not be again described; similar parts are denoted by the same reference characters with double primes added.

The conveyor 13" is made up of a flexible band of rubber or other tough flexible material suitably reinforced by steel wire. The conveyor has a series of sprocket openings along its length, which openings are lined by metal liners 75 which engage the teeth of sprocket 29". These metal liners 75 may ride upon the curved upper and lower supports 43", 36" which compel the tumbling conveyor to take the desired shape and which also support the upper ply where the work is being tumbled.

While certain novel features of the invention have been disclosed herein, and are pointed out in the annexed claims, it will be understood that various omissions, substitutions and changes may be made by those skilled in the art without departing from the spirit of the invention.

What is claimed is:

1. A continuous mill for treating workpieces, said mill comprising a tumbling conveyor, means causing said conveyor to move the workpieces from a lower position to an upper position carrying the workpieces along and then causing them to tumble back, a separate movable feed conveyor extending across the direction of tumbling movement of said workpieces, means for arranging said feed conveyor to provide a moving back stop against which said workpieces fall as they tumble back, said feed conveyor serving to advance said workpieces generally across the direction of tumbling movement.

2. In a mill, a tumbling conveyor comprising upper and lower shafts spaced both horizontally and vertically, wheels on said shafts, an endless carrying element riding said wheels, said carrying element forming upper and lower plies, the upper ply forming an upwardly concave pocket to support the workpieces, a feed conveyor extending across said tumbling conveyor and through said pocket at the posterior side thereof, whereby the movement of said tumbling conveyor carries the workpieces away from said feed conveyor and causes them to tumble back against said feed conveyor.

3. In a mill, a cabinet having upper and lower shafts spaced horizontally and vertically, an endless tumbling conveyor supported by said shafts and forming upper and lower plies, means for causing the upper ply to form an upwardly concave pocket to tumble the workpieces, an endless feed conveyor having a feed ply disposed in said pocket, said cabinet having feed and discharge openings in its end walls through which said feed ply extends, said feed ply being so positioned in said pocket that it carries said workpieces from said feed opening to said discharge opening and subjects them to the action of said tumbling conveyor.

4. In a mill, a cabinet having upper and lower shafts spaced horizontally and vertically, an endless tumbling conveyor supported by said shafts and forming upper and lower plies, means for causing the upper ply to form an upwardly concave pocket to tumble the workpieces, a feed conveyor disposed in said pocket and extending across the tumbling conveyor, said cabinet having end walls through which said feed conveyor extends, said end walls having a feed opening and a discharge opening, a feed chute connecting said feed opening, a discharge chute connected to said discharge opening, said feed conveyor extending into said feed and discharge chutes so as to carry workpieces into said pocket, through the mill and out of the mill.

5. In a mill, a cabinet having upper and lower shafts spaced horizontally and vertically, an endless tumbling conveyor supported by said shafts and forming upper and lower plies, means for causing the upper ply to form an upwardly concave pocket to tumble the workpieces, a feed conveyor comprising an endless band having one ply generally vertically disposed in said pocket, said cabinet having end walls through which said feed conveyor ply extends, extension housings at the ends of said cabinet, drums journaled in said housings supporting said feed conveyor, said end walls having a feed opening and a discharge opening, a feed chute connecting said feed opening, a discharge chute connected to said discharge opening, and a backing plate extending from feed opening to discharge opening against which the feed conveyor rides to support the latter against the pressure exerted by the workpieces.

6. In a continuous mill, a cabinet having upper and lower shafts spaced horizontally and vertically, an endless tumbling conveyor supported by said shafts and forming upper and lower plies, means for causing the upper ply to form an upwardly concave pocket to tumble the workpieces, a feed conveyor comprising an endless band having one ply generally vertically disposed at the posterior side of said pocket and the other ply on the opposite side of said lower shaft, said cabinet having end walls through which the plies of said feed conveyor extend, extension housings at the ends of said cabinet, drums journaled in said housings supporting said feed conveyor band, said end walls having a feed opening and a discharge opening, a feed chute connecting said feed opening, a discharge chute connected to said discharge opening, said feed conveyor extending into said feed and discharge chutes so as to carry workpieces into the mill, through the mill, and out of the mill, a backing plate extending from feed opening to discharge opening against which said feed conveyor rides to support the latter against the pressure exerted by the workpieces, and an airless blast wheel projecting through the top wall of the cabinet and directing a blast on the workpieces being tumbled.

7. A continuous mill for treating workpieces, said mill comprising a tumbling element for tumbling the workpieces, a feed conveyor extending across the direction of movement of the workpieces for feeding the workpieces as they are being tumbled, said tumbling element and conveyor being so related that said workpieces are contacted by both the tumbling element and the conveyor, and treating devices for treating the workpieces as they are being tumbled and fed through the mill.

8. The mill according to claim 7 in which means are provided for adjusting the speed of the feed conveyor independently of the speed of the tumbling element.

9. A continuous mill for treating workpieces, said mill having a tumbling zone and comprising a tumbling conveyor for tumbling the workpieces in the tumbling zone, a feed conveyor extending across the direction of movement of the tumbling conveyor and through the tumbling zone, both said conveyors contacting the workpieces so as to feed the workpieces through the mill as they are being tumbled, said mill having a feed station at one side of the tumbling zone for feeding the workpieces into contact with the feed conveyor and a discharge station at the other side of the tumbling zone for receiving workpieces from the feed conveyor.

DAVID C. TURNBULL.

REFERENCES CITED

The following references are of record in the file of this patent:

UNITED STATES PATENTS

| Number | Name | Date |
|---|---|---|
| 1,729,671 | Bell-Irving et al. | Oct. 1, 1929 |
| 2,047,106 | Lidberg et al. | July 7, 1936 |
| 2,131,772 | Turnbull | Oct. 4, 1938 |
| 2,204,588 | Guite | June 18, 1940 |
| 2,447,802 | Hirsch | Aug. 24, 1948 |

FOREIGN PATENTS

| Number | Country | Date |
|---|---|---|
| 20,637 | Great Britain | Sept. 17, 1906 |